United States Patent
Ho et al.

(10) Patent No.: US 11,726,587 B2
(45) Date of Patent: Aug. 15, 2023

(54) VIRTUAL IMAGE DISPLAY SYSTEM AND POINTING DIRECTION CONTROL METHOD OF CONTROL DEVICE THEREOF

(71) Applicant: HTC Corporation, Taoyuan (TW)

(72) Inventors: Chia-Chu Ho, Taoyuan (TW); Ching-Hao Lee, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/715,060

(22) Filed: Apr. 7, 2022

(65) Prior Publication Data

US 2023/0135658 A1 May 4, 2023

Related U.S. Application Data

(60) Provisional application No. 63/274,943, filed on Nov. 3, 2021.

(51) Int. Cl.
| | | |
|---|---|---|
| *G06F 3/038* | (2013.01) | |
| *G06T 19/00* | (2011.01) | |
| *G06F 3/0346* | (2013.01) | |
| *G02B 27/01* | (2006.01) | |

(52) U.S. Cl.
CPC .......... *G06F 3/0383* (2013.01); *G06F 3/0346* (2013.01); *G06T 19/006* (2013.01); *G02B 27/0172* (2013.01); *G02B 2027/014* (2013.01)

(58) Field of Classification Search
None
See application file for complete search history.

(56) References Cited

U.S. PATENT DOCUMENTS

| | | | | |
|---|---|---|---|---|
| 11,275,453 | B1 * | 3/2022 | Tham | G06F 3/04842 |
| 2014/0022235 | A1 * | 1/2014 | Hajjar | G09F 19/18 |
| | | | | 345/418 |
| 2015/0062161 | A1 * | 3/2015 | Kim | G06F 3/011 |
| | | | | 345/633 |
| 2020/0210768 | A1 * | 7/2020 | Turkelson | G06V 40/63 |
| 2020/0349353 | A1 * | 11/2020 | Guo | G06V 20/20 |
| 2021/0356743 | A1 * | 11/2021 | Muldoon | G06F 3/0482 |
| 2022/0065651 | A1 * | 3/2022 | Beaurepaire | G01C 21/3661 |
| 2022/0197480 | A1 * | 6/2022 | Tokuchi | G06F 3/04842 |

FOREIGN PATENT DOCUMENTS

| | | |
|---|---|---|
| CN | 109791446 | 5/2019 |
| TW | I639102 | 10/2018 |
| TW | I724354 | 4/2021 |

OTHER PUBLICATIONS

"Office Action of Taiwan Counterpart Application", dated May 2, 2023, p. 1-p. 7.

\* cited by examiner

*Primary Examiner* — Benjamin C Lee
*Assistant Examiner* — Emily J Frank
(74) *Attorney, Agent, or Firm* — JCIPRNET

(57) ABSTRACT

A virtual image display system and a pointing direction control method of a control device thereof are proposed. The pointing direction control method of the control device includes causing the control device to display an index pattern having a recognition pointing direction, causing a virtual image display device to capture the index pattern displayed by the control device, and causing the virtual image display device to analyze the recognition pointing direction of the index pattern and to display a control cursor according to the recognition pointing direction.

10 Claims, 5 Drawing Sheets

VIRTUAL IMAGE DISPLAY SYSTEM AND POINTING DIRECTION CONTROL METHOD OF CONTROL DEVICE THEREOF

CROSS-REFERENCE TO RELATED APPLICATION

This application claims the priority benefit of U.S. provisional application Ser. No. 63/274,943, filed on Nov. 3, 2021. The entirety of the above-mentioned patent application is hereby incorporated by reference herein and made a part of this specification.

BACKGROUND

Technical Field

The disclosure relates to a virtual image display system and a control method, particularly relates to a virtual image display system and a pointing direction control method of a control device thereof.

Description of Related Art

In the conventional virtual image display system, a cursor in a virtual image display frame may be controlled by a handheld control device. The handheld control device transmits the sensed inertial measurement information to a virtual image display device, such that the virtual image display device may estimate the position of the handheld control device according to the sensed inertial measurement information and control the pointing direction of the displayed cursor.

A way for the handheld control device to sense the inertial measurement information is by using the inertial measurement unit (IMU) to measure the displacement amount to control the cursor movement in the virtual image display frame according to the measured displacement amount of the handheld control device. However, the displacement amount measured by the existing IMU often accumulates error over time. When the error is accumulated to a certain extent, it becomes perceivable by a user, causing the user to suffer from error in the control operation of the existing virtual image display system and have poor user experience.

SUMMARY

The disclosure is directed to a pointing direction control method of a control device and a virtual image display system, which are adapted to reduce an error between a control cursor and a pointing direction of the control device.

The disclosure provides a pointing direction control method of a control device including: displaying an indicator pattern with a recognition pointing direction by the control device; capturing the indicator pattern displayed by the control device by a virtual image display device; and analyzing the recognition pointing direction of the indicator pattern by the virtual image display device and displaying a control cursor according to the recognition pointing direction.

The disclosure provides a virtual image display system including a control device and a virtual image display device. The control device is configured to display an indicator pattern with a recognition pointing direction. The virtual image display device is coupled to the control device. The virtual image display device is configured to capture the indicator pattern displayed by the control device, analyze the recognition pointing direction of the indicator pattern, and display a control cursor according to the recognition pointing direction.

Based on the above description, the virtual image display device of the disclosure may set a pointing direction of a control cursor displayed in a virtual image by recognizing the recognition pointing direction of the indicator pattern displayed by the control device. Therefore, the virtual image display device of the disclosure is adapted to reduce an error between the control cursor and the pointing direction of the control device, and effectively improve the user's sense of experience in virtual image experience.

DESCRIPTION OF THE EMBODIMENTS

Figure 1:
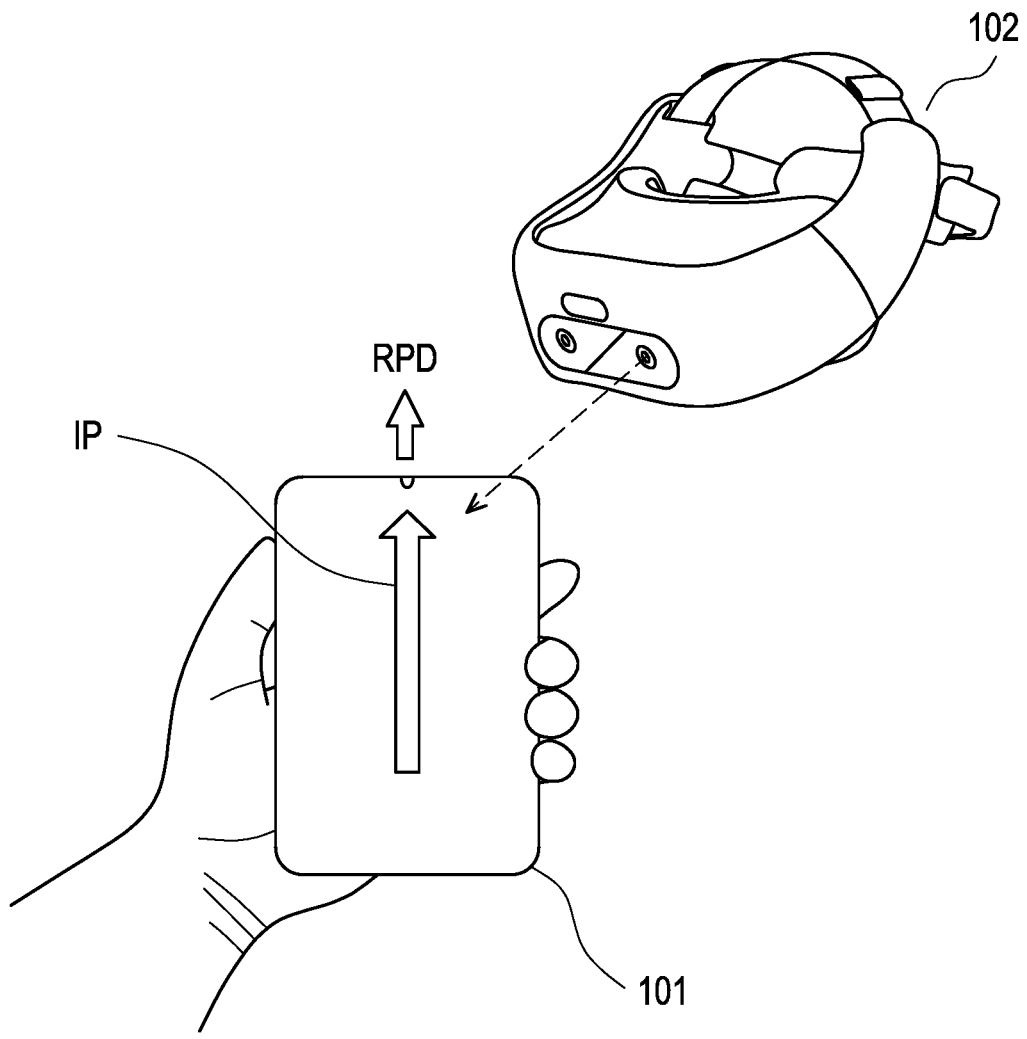
FIG. 1 is a schematic diagram of a virtual image display system according to an embodiment of the disclosure.

Referring to FIG. 1, FIG. 1 is a schematic diagram of a virtual image display system according to an embodiment of the disclosure. A virtual image display system 100 includes a control device 101 and a virtual image display device 102, where the virtual image display device 102 is coupled to the control device 101. The control device 101 is configured to display an indicator pattern IP, where the indicator pattern IP has a recognition pointing direction RPD. The control device 101 may be any handheld electronic device with a display function, such as a smart phone, a tablet computer, or a smart watch. In the embodiment of FIG. 1, the indicator pattern IP may be a pattern in the form of an arrow and point to the recognition pointing direction RPD. It should be noted that, in other embodiments, the indicator pattern IP may be a pattern of any shape that may be recognized to recognize the recognition pointing direction RPD.

The virtual image display device 102 is configured to capture the indicator pattern IP displayed by the control device 101, and the virtual image display device 102 is further configured to analyze the indicator pattern IP to obtain the recognition pointing direction RPD. Furthermore, the virtual image display device 102 displays a control cursor CC according to the recognition pointing direction PRD.

Figure 2:
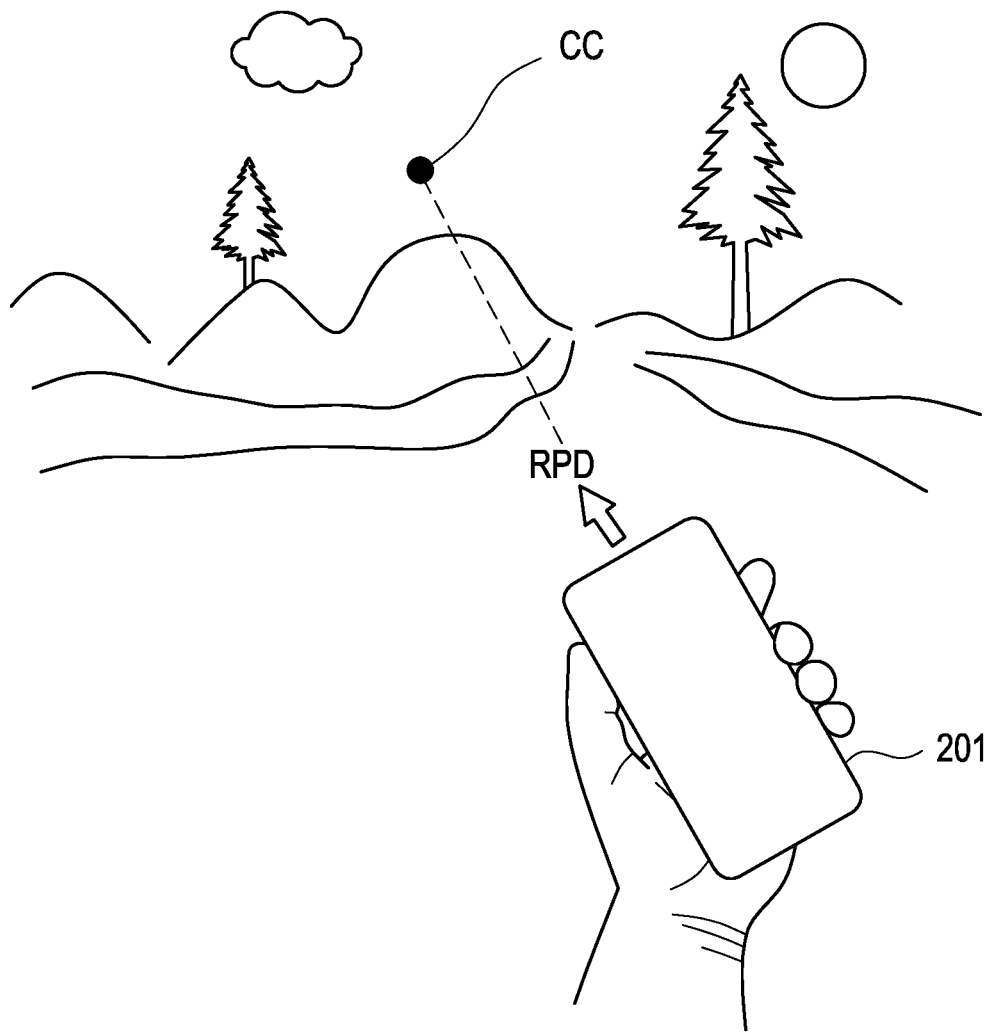
FIG. 2 is a schematic diagram of a virtual image frame according to an embodiment of the disclosure.

Referring to FIG. 1 and FIG. 2, FIG. 2 is a schematic diagram of a virtual image frame according to an embodiment of the disclosure. The virtual image display device 102 may be used to display a virtual image frame 200. The virtual image frame 200 includes a display frame of virtual reality and the control cursor CC. The virtual image display device 102 may generate the control cursor CC in the display frame of virtual reality according to an extended projection of the recognition pointing direction PRD. In some embodiments, the virtual image frame 200 may further include a virtual control device frame 201. A position of the virtual control device frame 201 may correspond to a position of the indicator pattern IP displayed by the control device 101 in reality, and the virtual control device frame 201 is directed toward the recognition pointing direction PRD.

In the embodiment, it should be noted that the virtual image display device 102 obtains the recognition pointing direction RPD by analyzing the indicator pattern IP of the control device 101, rather than obtaining the pointing direction only according to an outline of the control device 101. In this way, the control device 101 may be different handheld electronic devices manufactured by various manufacturers, and may have different sizes and shapes. In addition, the recognition pointing direction RPD has more directional information relative to the outline of the control device 101.

Figure 3:
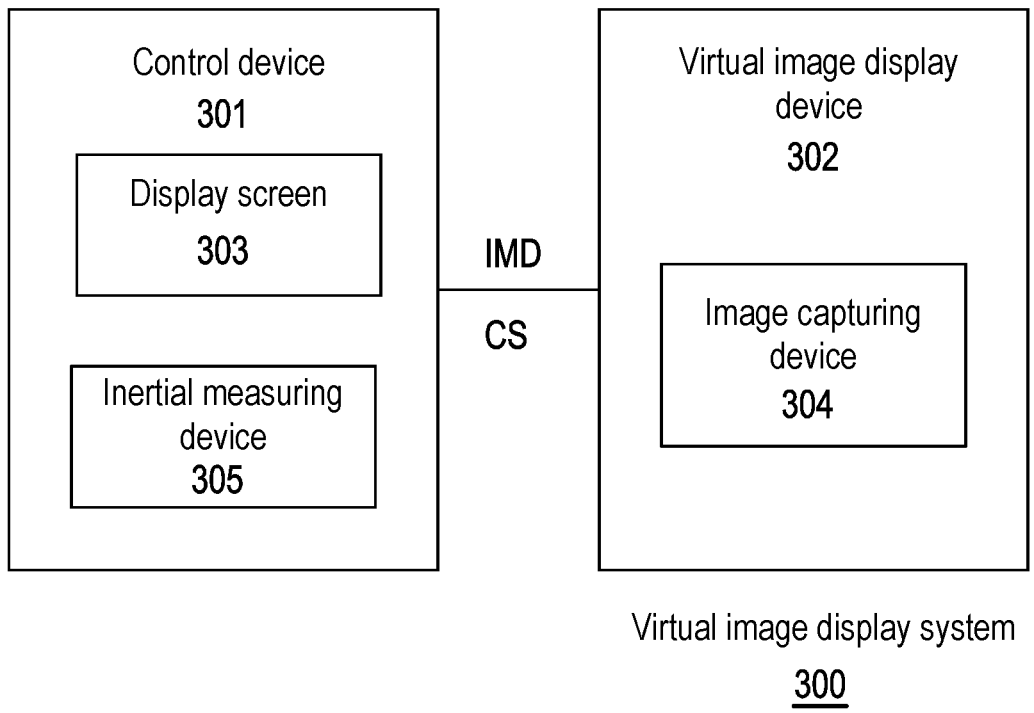
FIG. 3 is a hardware block diagram of a virtual image display system according to an embodiment of the disclosure.

Referring to FIG. 3, FIG. 3 is a hardware block diagram of a virtual image display system according to an embodiment of the disclosure. A virtual image display system 300 in FIG. 3 includes a control device 301 and a virtual image display device 302, and the virtual image display device 302 may be coupled to the control device 301 in a wired or wireless manner. The control device 301 has a display screen 303 for displaying the indicator pattern IP. The virtual image display device 302 has an image capturing device 304 for capturing the indicator pattern IP displayed on the display screen 303 of the control device 301. In the embodiment, the image capturing device 304 is, for example, a camera or a video camera, which may be used to capture static or dynamic images. Any communication protocol well-known to those skilled in the art may be used for information transmission between the control device 301 and the virtual image display device 302. In addition, the control device 301 further includes an inertial measuring device 305. The inertial measuring device 305 is used to measure the inertial measurement information IMD. Furthermore, the control device 301 transmits the inertial measurement information IMD to the virtual image display device 302. In other embodiments, the virtual image display device 302 may transmit a command signal CS to the control device 301 to control the display of the indicator pattern IP of the control device 301.

Figure 4:
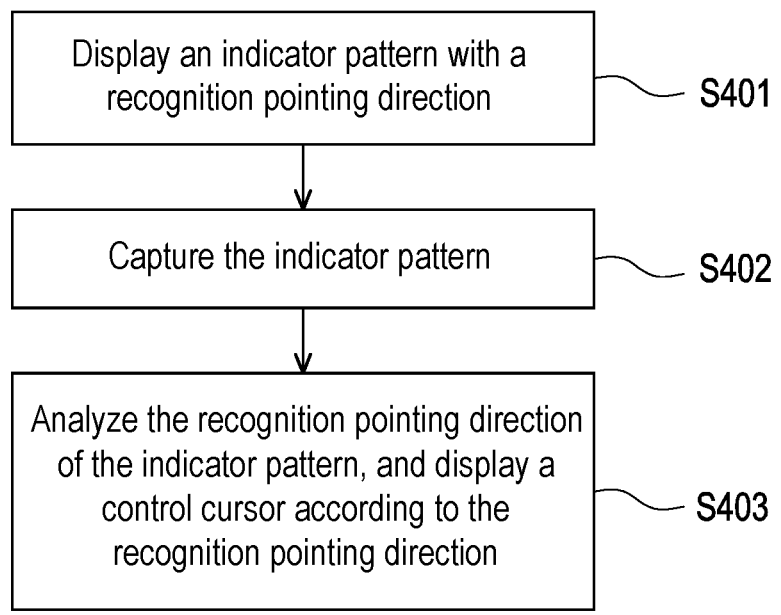
FIG. 4 is a flowchart of a pointing direction control method of a control device according to an embodiment of the disclosure.

Referring to FIG. 4, FIG. 4 is a flowchart of a pointing direction control method of a control device according to an embodiment of the disclosure. In step S401, the control device 101 displays the indicator pattern IP having the recognition pointing direction RPD. In step S402, the virtual image display device 102 captures the indicator pattern IP displayed by the control device 101. In step S403, the virtual image display device 102 analyzes the recognition pointing direction RPD of the indicator pattern IP. The virtual image display device 102 displays the control cursor CC according to the recognition pointing direction RPD.

According to the above virtual image display system of FIG. 1 and the pointing direction control method of the control device of FIG. 4, the virtual image display system and the control method of the disclosure may control the cursor according to the recognition pointing direction of the control device, and avoid poor control experience caused by errors accumulated by the inertial measuring device, which may be adapted to outline shapes of various control devices (handheld electronic devices), and may provide directional information to control the cursor according to the recognition pointing direction.

Figure 5:
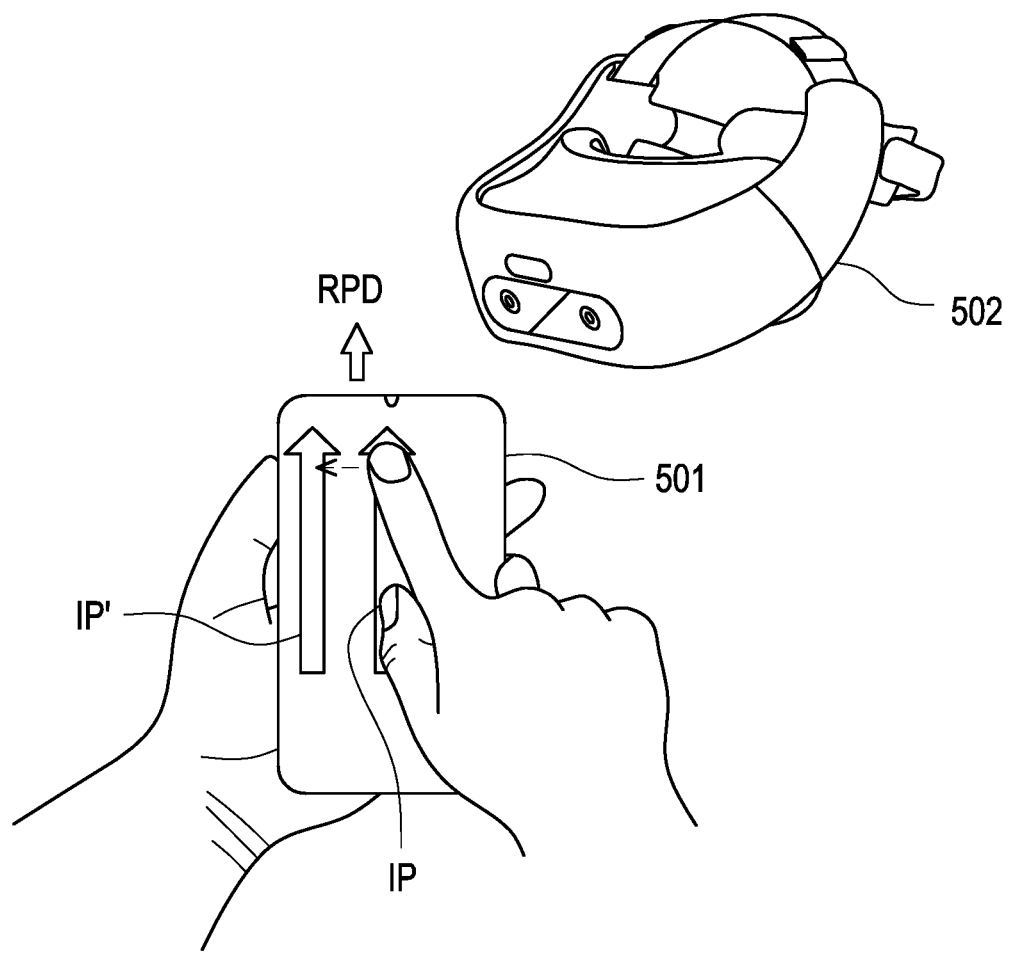
FIG. 5 is a schematic diagram of a virtual image display system according to another embodiment of the disclosure.

Referring to FIG. 5, FIG. 5 is a schematic diagram of a virtual image display system according to another embodiment of the disclosure. A virtual image display system 500 includes a control device 501 and a virtual image display device 502. Basic operations of the virtual image display system 500 are similar to that of the virtual image display system 100 of FIG. 1, and details thereof are not repeated. Different from FIG. 1, in the embodiment, when the virtual image display device 502 captures the indicator pattern IP, if the virtual image display device 502 cannot effectively capture the indicator pattern IP, it means that the indicator pattern IP in the display screen of the control device 501 may be shielded at this moment. The virtual image display device 502 may send a command signal CS to the control device 501. Correspondingly, the control device 501 may adjust a display position of the indicator pattern IP according to the command signal CS.

In FIG. 5, the indicator pattern IP is shielded by user's finger. At this moment, the virtual image display device 502 may send the command signal CS to the control device 501, and the control device 501 may adjust an original display position of the indicator pattern IP to display a new indicator pattern IP'. In this way, the virtual image display device 502 may successfully capture the new indicator pattern IP'. It should be noted that the indicator pattern IP and the indicator pattern IP' have the same pointing direction.

Figure 6:
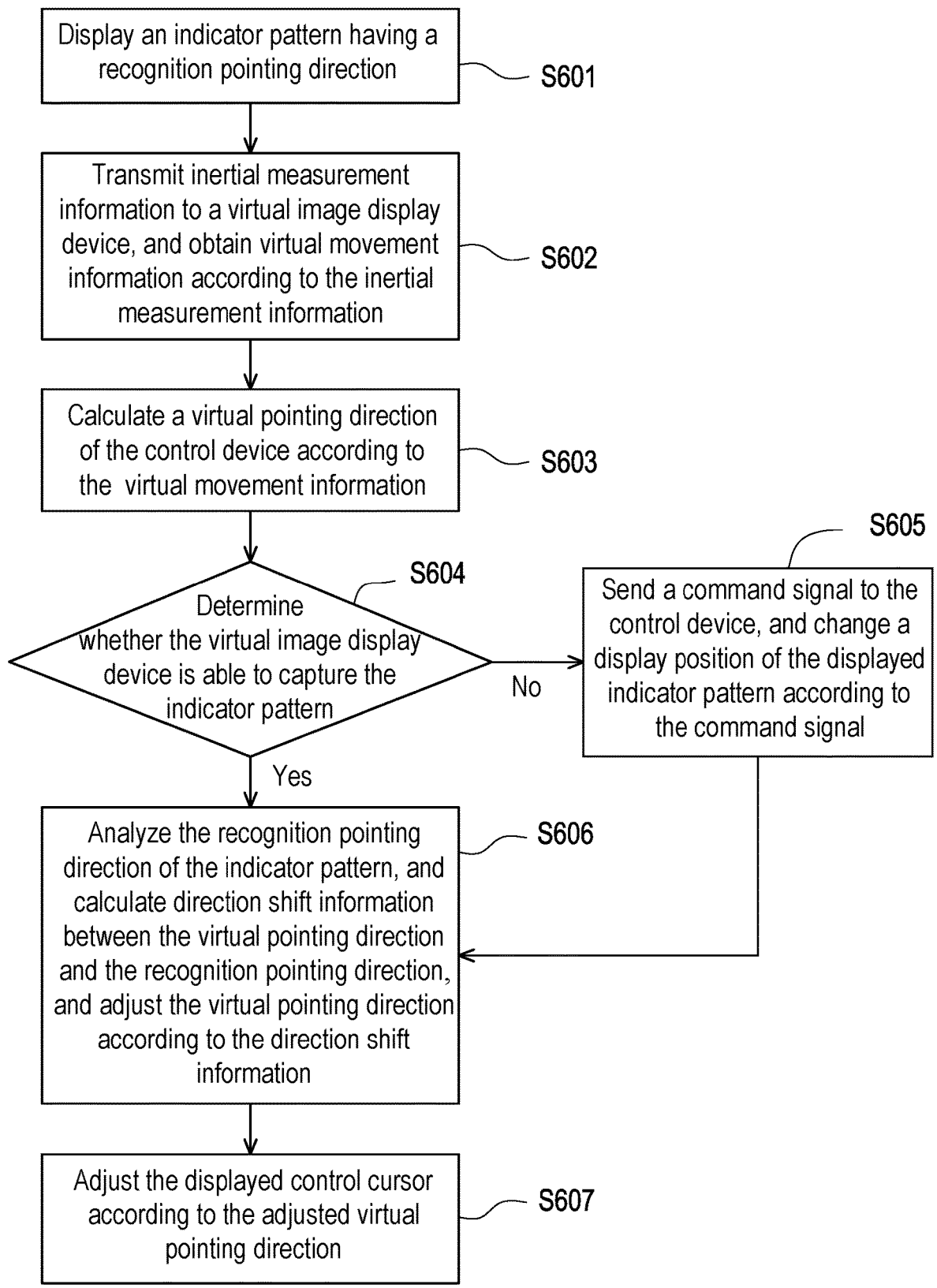
FIG. 6 is a flowchart of a pointing direction control method of a control device according to another embodiment of the disclosure.

Referring to FIG. 6 and FIG. 3, FIG. 6 is a flowchart of a pointing direction control method of a control device according to another embodiment of the disclosure. In step S601, the control device 301 may display the indicator pattern IP having the recognition pointing direction RPD on the display screen 303. In step S602, the control device 301 transmits the inertial measurement information IMD to the virtual image display device 302, and the virtual image display device 302 obtains virtual movement information according to the inertial measurement information IMD. The inertial measurement information IMD may be measured and generated by the inertial measuring device 305 in the control device 301. The virtual image display device 302 may calculate the virtual movement information of the control device 301 according to the inertial measurement information IMD.

In step S603, the virtual image display device 302 calculates a virtual pointing direction of the control device 301 according to the above-mentioned virtual movement information. It should be noted that since the virtual pointing direction is calculated according to the inertial measurement information IMD, there may be an error between the virtual pointing direction and the actual pointing direction of the control device 301 as time is accumulated.

In step S604, the virtual image display device 302 determines whether the indicator pattern IP may be captured. If the determination result is yes, then step S606 is performed; and if the determination result is negative, it means that the indicator pattern IP is probably shielded, and step S605 is performed. In step S605, the virtual image display device 302 sends the command signal CS to the control device 301, and the control device 301 changes a display position of the displayed indicator pattern IP according to the command signal CS.

In step S606, the virtual image display device 302 may analyze the recognition pointing direction RPD of the indicator pattern IP, and calculate direction shift information between the virtual pointing direction and the recognition pointing direction RPD; and the virtual image display device 302 adjusts the virtual pointing direction according to the direction shift information. In step S606, since the virtual image display device 302 may obtain an actual pointing direction of the control device 301 through the recognition pointing direction RPD, the error between the virtual pointing direction and the actual pointing direction of the control device 301 may be effectively reduced.

In step S607, the virtual image display device 302 may adjust the displayed control cursor CC according to the adjusted virtual pointing direction, and may generate the control cursor CC in consistence with the actual pointing direction of the control device 301.

In summary, the pointing direction control method of the control device and the virtual image display system of the disclosure may adjust the position of the control cursor by recognizing the recognition pointing direction of the indicator pattern displayed by the control device, which may reduce the display error of the control cursor and achieve good control experience.

What is claimed is:

1. A pointing direction control method of a control device, comprising:
    displaying an indicator pattern by the control device, wherein the indicator pattern has a recognition pointing direction;
    capturing the indicator pattern displayed by the control device by a virtual image display device;
    analyzing the recognition pointing direction of the indicator pattern by the virtual image display device to determine a control cursor, and displaying the control cursor according to the recognition pointing direction;
    sending a command signal to the control device by the virtual image display device when the indicator pattern is displayed by the control device and the indicator pattern is unable to be captured by the virtual image display device; and
    changing a display position of the displayed indicator pattern by the control device according to the command signal.

2. The pointing direction control method of the control device as claimed in claim 1, further comprising:
    transmitting inertial measurement information to the virtual image display device by the control device; and
    obtaining virtual movement information of the control device by the virtual image display device according to the inertial measurement information.

3. The pointing direction control method of the control device as claimed in claim 2, further comprising:
    calculating a virtual pointing direction of the control device by the virtual image display device according to the virtual movement information.

4. The pointing direction control method of the control device as claimed in claim 3, further comprising:
    calculating direction shift information between the virtual pointing direction and the analyzed recognition pointing direction by the virtual image display device; and
    adjusting the virtual pointing direction by the virtual image display device according to the direction shift information.

5. The pointing direction control method of the control device as claimed in claim 4, wherein displaying the control cursor according to the recognition pointing direction comprises:
    adjusting the displayed control cursor according to the adjusted virtual pointing direction.

6. A virtual image display system, comprising:
    a control device, configured to display an indicator pattern, wherein the indicator pattern has a recognition pointing direction; and
    a virtual image display device, coupled to the control device, and configured to:
        capture the indicator pattern displayed by the control device; and
        analyze the recognition pointing direction of the indicator pattern to determine a control cursor, and display the control cursor according to the recognition pointing direction;
    wherein when the indicator pattern is displayed by the control device and the virtual image display device is unable to capture the indicator pattern, the virtual image display device sends a command signal to the control device, and the control device changes a display position of the displayed indicator pattern according to the command signal.

7. The virtual image display system as claimed in claim 6, wherein the control device comprises an inertial measuring device, the inertial measuring device transmits inertial measurement information to the virtual image display device, and the virtual image display device obtains virtual movement information of the control device according to the inertial measurement information.

8. The virtual image display system as claimed in claim 7, wherein the virtual image display device calculates a virtual pointing direction of the control device according to the virtual movement information.

9. The virtual image display system as claimed in claim 8, wherein the virtual image display device calculates direction shift information between the virtual pointing direction and the analyzed recognition pointing direction, and the virtual image display device adjusts the virtual pointing direction according to the direction shift information.

10. The virtual image display system as claimed in claim 9, wherein the virtual image display device adjusts the displayed control cursor according to the adjusted virtual pointing direction.

* * * * *